(12) United States Patent
Inoue

(10) Patent No.: US 6,423,243 B2  
(45) Date of Patent: Jul. 23, 2002

(54) MANGANESE-ZINC BASE FERRITE

(75) Inventor: Shoji Inoue, Tokyo (JP)

(73) Assignee: TDK Corporation, Tokyo (JP)

(*) Notice: Subject to any disclaimer, the term of this patent is extended or adjusted under 35 U.S.C. 154(b) by 0 days.

(21) Appl. No.: 09/855,646

(22) Filed: May 16, 2001

Related U.S. Application Data

(63) Continuation of application No. PCT/JP00/06218, filed on Sep. 12, 2000.

(30) Foreign Application Priority Data

Sep. 17, 1999 (JP) ............................................. 11-264061

(51) Int. Cl.$^7$ ................................................. H01F 1/34
(52) U.S. Cl. ............................... 252/62.62; 252/62.63; 252/62.59
(58) Field of Search .......................... 252/62.62, 62.63, 252/62.59

(56) References Cited

U.S. PATENT DOCUMENTS 3,837,910 A    9/1974   Van Der Laan et al. .... 117/234
5,498,361 A    3/1996   Matsukawa et al. ..... 252/62.62

FOREIGN PATENT DOCUMENTS

| JP | 5-55463 B   | 8/1993 |
| JP | 5058721     | 9/1993 |
| JP | 6-204025    | 7/1994 |
| JP | WO 01/22440 | 3/2001 |

*Primary Examiner*—C. Melissa Koslow  
(74) *Attorney, Agent, or Firm*—Oblon, Spivak, McClelland, Maier & Neustadt, P.C.

(57) ABSTRACT

A manganese-zinc base ferrite containing iron oxide, manganese oxide and zinc oxide as main components in amounts calculated as $Fe_2O_3$, MnO and ZnO, respectively,

| $Fe_2O_3$ | 50 to 56 mol %, |
| MnO | 21 to 27 mol %, and |
| ZnO | 20 to 26 mol %, | and 0.0003 to 0.003% by weight calculated as P of phosphorus as an auxiliary component, and having a mean grain size from more than 50 μm to 200 μm.

23 Claims, 1 Drawing Sheet

MANGANESE-ZINC BASE FERRITE

CROSS-REFERENCE TO RELATED APPLICATION

This application is a continuation of International Application No. PCT/JP00/06218 filed Sep. 12, 2000 and Japanese Application No. 11-264061 filed Sep. 17, 1999, and the entire content of both applications is hereby incorporated by reference.

BACKGROUND OF THE INVENTION

1. Field of the Invention

This invention relates to manganese-zinc base ferrite, and more particularly, to high permeability manganese-zinc base ferrite suitable as cores in broad-band transformers.

2. Description of the Background

For broad-band transformers such as pulse transformers, a core-forming manganese-zinc base ferrite having a high magnetic permeability over a broad band, and especially throughout the band of 10 to 500 kHz is needed in order to enable accurate digital communication.

The electromagnetic properties such as permeability and loss of manganese-zinc base ferrite have structure sensitivity and are largely affected by its micro-structure. In general, the permeability of such ferrite is increased by selecting a composition giving a low crystal magnetic anisotropy constant and a low magnetostriction constant, increasing the grain size, reducing vacancy, and increasing the sintered density. This is because the above choice facilitates magnetic wall migration. It is believed that permeability is governed by magnetic wall migration. Also auxiliary components have a substantial influence on the magnetic properties. Unless the contents of auxiliary components are controlled, the auxiliary components can prevent smooth migration of magnetic walls due to precipitation on grain boundaries, promoted abnormal grain growth and promoted void formation, leading to a decline of permeability.

JP-B 5-55463 discloses a sintering type oxide magnetic material comprising ferric oxide, manganese oxide and zinc oxide as main components, and up to 0.01 wt % of silicon dioxide and up to 0.02 wt % of calcium oxide as auxiliary components, characterized in that the material further contains 0.02 to 0.05 wt % of bismuth oxide and 0.005 to 0.05 wt % of aluminum oxide as auxiliary components, and has an initial permeability $\mu_0$ of at least 18,000 and a relative loss factor $\tan\delta/\mu$ of up to $2.0\times10^{-6}$; an oxide magnetic material in the form of a sintered body produced by sintering the above material at 1300 to 1370° C.; and an oxide magnetic material in which the temperature coefficient of $\mu_0$ is always kept positive due to addition of aluminum oxide. Although the magnetic material described in this patent is allegedly suitable for use as communication transformer cores, it fails to provide the high permeability character required to be commensurate with higher transmission speeds.

As the technique relating to large grain sizes, JP-B 52-29439 discloses a method of preparing a polycrystalline manganese-zinc ferrite body by shaping a fine ferrite-forming mixture into an article of desired shape, followed by compression and sintering, characterized in that a grain growth promoting substance selected from among $SrF_2$, oxides of B, Bi, Ca, Cu, Mg, Pb, Si and V, and $Fe_3(PO_4)_2$ and mixtures of any is added in an amount of 0.005 to 1 wt % based on the ferrite at any preparation stage prior to the sintering step, and the sintering is conducted at a temperature of 1350 to 1400° C. until conjugated crystals having a mean grain size of at least 50 $\mu$m are formed. However, the application of this ferrite is limited to heads. Its object is to provide a head having improved anti-decay and long lifetime characteristics by virtue of irregularly conjugated crystals having a large grain size, unlike the object of the present invention to provide a high permeability by making use of very large crystal grains, and the high permeability characteristics required for pulse transformers in transmitters are not available. Additionally, this ferrite, intended to be applied to heads, does not have a high permeability as required in pulse transformers in transmitters.

Under the circumstances, the present applicant proposed in JP-A 6-204025 a manganese-zinc base ferrite having a high permeability over a broad band and especially throughout the band of 10 to 500 kHz. Disclosed in this patent is a manganese-zinc base ferrite comprising 50 to 56 mol % calculated as $Fe_2O_3$ of iron oxide, 22 to 39 mol % calculated as MnO of manganese oxide, and 8 to 25 mol % calculated as ZnO of zinc oxide, which is sintered after addition of up to 800 ppm calculated as $Bi_2O_3$ of bismuth oxide and up to 1200 ppm calculated as $MoO_3$ of molybdenum oxide.

The manganese-zinc base ferrite disclosed in this patent exhibits a high initial permeability over a broad band as demonstrated by an initial permeability of at least 9000, at least 9000 and at least 3000 at 10 kHz, 100 kHz and 500 kHz and 25° C., respectively.

In order to accomplish size reduction and higher transmission speed for pulse transformers, it is crucial for ferrite to have a higher permeability especially in a frequency region near 10 kHz. The provision of a high permeability permits a smaller number of windings to provide a higher inductance and a lower distributed capacity and enables passage of signals in a broad band.

Meanwhile, aiming to provide a manganese-zinc base ferrite having a high permeability over a broad band (typically a permeability of at least 9000 in a frequency region of 10 to 100 kHz) and especially, a high permeability throughout a frequency region of 10 to 500 kHz, JP-A 6-204025 of the present applicant proposes a manganese-zinc base ferrite comprising 50 to 56 mol % calculated as $Fe_2O_3$ of iron oxide, 22 to 39 mol % calculated as MnO of manganese oxide, and 8 to 25 mol % calculated as ZnO of zinc oxide, which is sintered after addition of up to 800 ppm calculated as $Bi_2O_3$ of bismuth oxide and up to 1200 ppm calculated as $MoO_3$ of molybdenum oxide. This ferrite, however, fails to provide the necessary high permeability characteristics.

SUMMARY OF THE INVENTION

An object of the invention is to provide a manganese-zinc base ferrite having a high permeability over a broad band and especially, a high permeability in a frequency region in proximity to 10 to 100 kHz.

This and other objects are achieved by any of the following constructions (1) to (7).

(1) A manganese-zinc base ferrite comprising iron oxide, manganese oxide and zinc oxide as main components in amounts calculated as $Fe_2O_3$, MnO and ZnO, respectively,

| | |
|---|---|
| $Fe_2O_3$ | 50 to 56 mol %, |
| MnO | 21 to 27 mol %, and |
| ZnO | 20 to 26 mol %, | and 0.0003 to 0.003% by weight calculated as P of phosphorus as an auxiliary component, and having a mean grain size from more than 50 $\mu$m to 200 $\mu$m.

(2) The manganese-zinc base ferrite of (1) further comprising more than 0% to 0.08% by weight of bismuth oxide as an auxiliary component, based on the main components and calculated as $Bi_2O_3$.

(3) The manganese-zinc base ferrite of (1) or (2) further comprising more than 0% to 0.12% by weight of molybdenum oxide as an auxiliary component, based on the main components and calculated as $MoO_3$.

(4) The manganese-zinc base ferrite of any one of (1) to (3) further comprising at least one oxide of niobium oxide, tantalum oxide and zirconium oxide as an auxiliary component in amounts calculated as $Nb_2O_5$, $Ta_2O_5$ and $ZrO_2$, respectively,

| | |
|---|---|
| $Nb_2O_5$ | more than 0 to 0.03 wt %, |
| $Ta_2O_5$ | more than 0 to 0.06 wt %, and |
| $ZrO_2$ | more than 0 to 0.06 wt %. |

(5) The manganese-zinc base ferrite of any one of (1) to (4) further comprising 0.005 to 0.05% by weight, calculated as CaO, of calcium oxide.

(6) The manganese-zinc base ferrite of any one of (1) to (5), having a permeability of at least 15,000 at 10 kHz.

(7) The manganese-zinc base ferrite of any one of (1) to (6), having a permeability of at least 15,000 at 100 kHz.

DETAILED DESCRIPTION OF THE PREFERRED EMBODIMENTS

Figure 1:
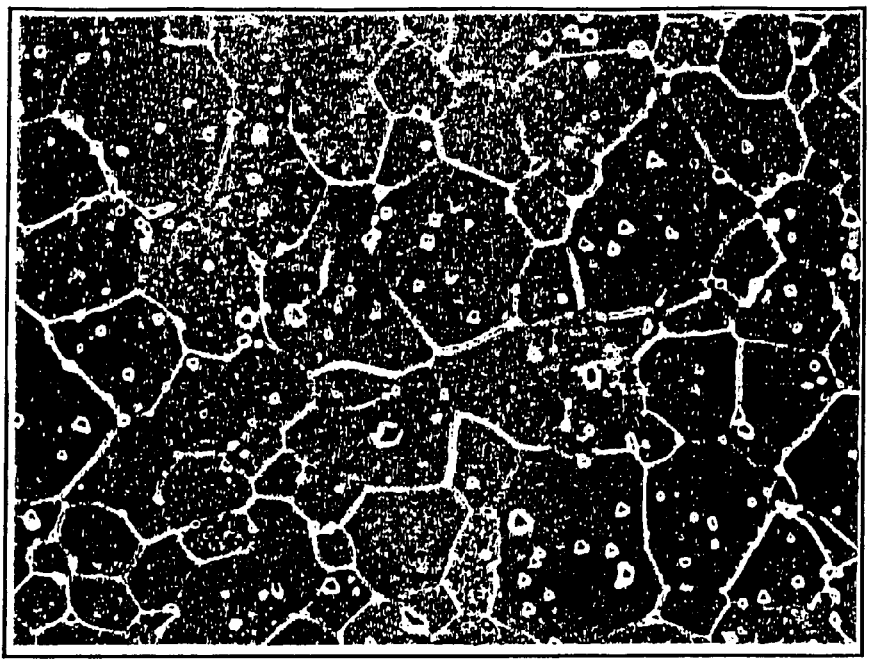
FIG. 1 is a drawing-substituting photograph showing a cross section of an inventive sample.

According to the invention, by controlling the temperature condition and the atmosphere during firing of phosphorus-containing manganese-zinc base ferrite, a sintered body having a mean crystal grain size from more than 50 $\mu$m to 200 $\mu$m is obtained without abnormal crystal growth. Due to the synergistic effects of such a crystal grain size combined with a trace amount of additive element, the resulting manganese-zinc base ferrite has a permeability of at least 15,000 at 10 kHz. This leads to the advantage that when a core formed of the inventive manganese-zinc base ferrite is incorporated in a pulse transformer, for example, the high permeability the ferrite has acquired permits a smaller number of windings to provide a higher inductance and a lower distributed capacity and enables passage of signals in a broad band.

As compared with prior art manganese-zinc base ferrites, the manganese-zinc base ferrite of the invention has a high permeability at 100 kHz which is 15,000 or greater. When transformers are manufactured, this enables to reduce the number of windings and the size of transformers. Especially transformers can be manufactured which exhibit high performance in digital transmission systems such as ISDN and ADSL.

Now the illustrative construction of the invention is described in detail.

The manganese-zinc base ferrite of the invention is defined as comprising 50 to 56 mol % calculated as $Fe_2O_3$ of iron oxide, 21 to 27 mol % calculated as MnO of manganese oxide, and 20 to 26 mol % calculated as ZnO of zinc oxide as main components, and 0.0003 to 0.003% by weight calculated as P of phosphorus as an auxiliary component, and having a mean grain size from more than 50 $\mu$m to 200 $\mu$m.

With respect to the main components, it is preferred that the content of iron oxide be 50 to 56 mol %, especially 52 to 54 mol %, calculated as $Fe_2O_3$, the content of manganese oxide be 21 to 27 mol %, especially 23 to 25 mol %, calculated as MnO, and the content of zinc oxide be 20 to 26 mol %, especially 22 to 24 mol %, calculated as ZnO. Outside the range, a decline of permeability at 10 kHz is likely to occur.

Also the manganese-zinc base ferrite of the invention may contain calcium oxide and silicon oxide as auxiliary components. The contents of these auxiliary components are 0.005 to 0.05% by weight, especially 0.01 to 0.03% by weight, calculated as CaO, and 0.005 to 0.015% by weight calculated as $SiO_2$. It is noted that CaO and $SiO_2$ are generally present at grain boundaries.

Preferably, the inventive ferrite contains bismuth oxide and molybdenum oxide, especially in the form of $Bi_2O_3$ and $MoO_3$, respectively. In this regard, since the oxide components of bismuth and molybdenum added, especially the molybdenum oxide component, will partially evaporate off or sublimate during firing, the contents of bismuth oxide and molybdenum oxide in the ferrite are sometimes not coincident with the addition amounts. This suggests that the content of bismuth oxide is preferably about 50 to 100% by weight, calculated as $Bi_2O_3$, of the addition amount and the content of molybdenum oxide is preferably about 10 to 60% by weight, especially about 10 to 30% by weight, calculated as $MoO_3$, of the addition amount.

The ferrite of the invention contains 0.0003 to 0.003% by weight, and preferably 0.0005 to 0.002% by weight, calculated as P of phosphorus as an auxiliary component. The inclusion of phosphorus permits larger crystal grains to form at a lower sintering temperature. In particular, since high permeability ferrite is often processed in a sintering furnace near its performance limit, a lowering of the sintering temperature allows for a margin to the operating conditions of the furnace.

As a further auxiliary component, the ferrite of the invention preferably contains at least one oxide of niobium oxide, tantalum oxide and zirconium oxide in amounts calculated as $Nb_2O_5$, $Ta_2O_5$ and $ZrO_2$, respectively,

| | |
|---|---|
| $Nb_2O_5$ | more than 0 to 0.03 wt %, more preferably 0.003 to 0.02 wt %, and especially 0.005 to 0.01 wt %, |
| $Ta_2O_5$ | more than 0 to 0.06 wt %, more preferably 0.01 to 0.04 wt %, and especially 0.015 to 0.03 wt %, and |
| $ZrO_2$ | more than 0 to 0.06 wt %. more preferably 0.01 to 0.04 wt %, and especially 0.015 to 0.03 wt %. |

The inclusion of these auxiliary components leads to an outstanding increase of permeability especially on the high frequency side. Of these elements, zirconium is especially preferred. When two or more elements are added together, a combination of zirconium oxide and tantalum oxide is preferred. When two or more elements are used, their mixing ratio is not critical.

The ferrite of the invention containing the above-mentioned components has a mean crystal grain size from more than 50 $\mu$m to 200 $\mu$m. Too small a mean grain size leads to a decline of permeability at 10 kHz, probably failing to achieve a permeability of at least 15,000 at 10 kHz. Too large a mean grain size, though being able to achieve a permeability of at least 15,000 at 10 kHz, leads to a decline of permeability at 100 kHz. It is noted that the mean grain size is determined by etching a mirror polished surface with acid, observing the surface under an optical microscope, measuring the diameters of equivalent circles of polycrystalline grains, and computing an average therefrom.

Preferably the manganese-zinc base ferrite of the invention has a mean crystal grain size from more than 50 $\mu$m to 180 $\mu$m, more preferably 60 to 150 $\mu$m, and most preferably 70 to 130 $\mu$m. In the manganese-zinc base ferrite of the invention, those grains having a grain size from more than 50 $\mu$m to 140 $\mu$m preferably account for at least 50% by volume, more preferably at least 70% by volume and most preferably at least 80% by volume. The permeability at 10 kHz of the inventive manganese-zinc base ferrite is preferably at least 20,000, and especially at least 25,000. The permeability at 10 kHz of the inventive manganese-zinc base ferrite that has been achieved so far is about 35,000 at maximum. The higher the permeability, the better becomes the performance.

A large mean crystal grain size and a narrow distribution of grain size as mentioned above enable to achieve a permeability at 10 kHz and 25° C. of at least 15,000, especially at least 20,000, further at least 25,000, for example, 15,000 to 35,000; a permeability at 100 kHz of at least 10,000, especially at least 12,000, further at least 15,000, for example, about 10,000 to 22,000; and a permeability at 500 kHz of at least 2,000, especially at least 3,000, further at least 3,500, for example, about 3,500 to 6,000, which are comparable to or greater than those available in the prior art.

The manganese-zinc base ferrite of the invention is prepared by first furnishing a mixture of customary iron oxide, manganese oxide and zinc oxide ingredients to serve as the main components. These ingredients used as starting materials for the main components are mixed in such amounts as to provide the above-defined ratio in the final composition of ferrite. If necessary, calcium oxide or a compound capable of converting to calcium oxide upon firing such as calcium carbonate, silicon oxide or a compound capable of converting to silicon oxide upon firing, and the like are added as starting materials for auxiliary components. The starting materials for auxiliary components are added in such amounts as to provide the above-defined ratio in the final composition of magnetic material.

Also if necessary, bismuth oxide and molybdenum oxide components are added as auxiliary components. The bismuth oxide component used herein may be $Bi_2O_3$, $Bi_2(SO_4)_3$, etc., with $Bi_2O_3$ being preferred. The bismuth oxide component added is up to 0.08% by weight, preferably up to 0.06% by weight, and more preferably 0.005 to 0.04% by weight, calculated as $Bi_2O_3$. Addition amounts beyond the range rather lead to a permeability decline.

The molybdenum oxide component used herein may be $MoO_3$, $MoCl_3$, etc., with $MoO_3$ being preferred. The molybdenum oxide component added is up to 0.12% by weight, preferably up to 0.1% by weight, and more preferably 0.003 to 0.05% by weight, calculated as $MoO_3$. Addition amounts beyond the range rather lead to a permeability decline.

Phosphorus is added as an auxiliary component in an amount of 0.0003 to 0.003% by weight calculated as P. Also, at least one oxide of niobium oxide, tantalum oxide and zirconium oxide is added to the starting mixture if necessary. It is preferred to use $Nb_2O_5$ as niobium oxide, $Ta_2O_5$ as tantalum oxide and $ZrO_2$ as zirconium oxide. The addition amounts of these oxides are from more than 0 to 0.03 wt % of $Nb_2O_5$, from more than 0 to 0.06 wt % of $Ta_2O_5$, and from more than 0 to 0.06 wt % of $ZrO_2$.

Once the main components and trace additive components are mixed, a small amount, for example, 0.1 to 1.0% by weight of a suitable binder such as polyvinyl alcohol is added to the mixture, which is atomized into granules having a diameter of about 80 to 200 $\mu$m through a spray dryer or the like, which are shaped into a compact.

Next, the compact is fired. The firing should comply with the following conditions.

In the method of preparing the manganese-zinc base ferrite according to the invention, the temperature holding step during firing of the compact of ferrite material following calcination sets a holding temperature in the range of 1,200 to 1,450° C., especially 1,350 to 1,450° C. The temperature holding step may be preceded by a temperature lowering step during firing which sets a lowest temperature in the range of 1,000 to 1,400° C. and a lowering temperature of at least 30° C., especially at least 50° C.

The holding temperature in the temperature holding step is set in the range of 1,200 to 1,450° C. because it is effective for promoting ferrite formation and controlling the crystal grain size. Within this temperature range, an improvement in permeability, especially at 10 kHz, is achievable. The holding time of the temperature holding step is preferably about ½ to 10 hours.

The heating step, temperature holding step and subsequent cooling step used in the firing process according to the invention may follow a temperature profile as in the prior art firing process. Specifically, the heating rate of the heating step is preferably 20 to 500° C./hr. The heating rate may be varied in two or more stages. In this case, the heating rate is higher in the initial stage, and gradually lowered in the later stages. In the event of two stage heating, for example, it is preferred to set the heating rate of the first stage to about 200 to 500° C./hr and the heating rate of the second stage to about 20 to 200° C./hr. On the other hand, the cooling rate of the cooling step is preferably set to 20 to 500° C./hr. In the cooling step, the cooling rate may also be varied in two or more stages. In the event of two stage cooling, it is preferred that the cooling rate of the first stage be about 20 to 200° C./hr and the cooling rate of the second stage be about 200 to 500° C./hr.

The furnace used for firing according to the invention may be either a continuous one or a batchwise one. The atmosphere during firing may be adjusted in accordance with the theory of equilibrium oxygen partial pressure. Firing is preferably conducted in a nitrogen atmosphere having a controlled oxygen partial pressure (inclusive of an atmosphere consisting solely of oxygen).

In this way, the manganese-zinc base ferrite of the invention is obtained.

EXAMPLE

Examples of the invention are given below for further illustrating the invention.

Example 1

Samples were obtained by using 24 mol % of MnO, 23 mol % of ZnO, and 53 mol % of $Fe_2O_3$ as main components, 0.02 wt % (calculated as CaO and based on the final composition of magnetic material) of $CaCO_3$, 0.01 wt % (based on the final composition of magnetic material) of $SiO_2$, 0.02 wt % of $Bi_2O_3$ and 0.02 wt % of $MoO_3$ as auxiliary components, and adding 0.0008 wt % of P as an additive.

After the ingredients were mixed, a binder was added to the mixture, which was granulated to a mean particle diameter of 150 µm by means of a spray dryer. The granules were shaped into 100 compacts. The compacts were heated in a nitrogen atmosphere having $PO_2$ of 0.5%, held in an atmosphere having an oxygen concentration of at least 20% at a constant temperature of 1,380 to 1,450° C. for 1 to 10 hours for sintering, then cooled in an atmosphere having a controlled oxygen partial pressure, yielding toroidal cores having a mean grain size from more than 50 µm to 200 µm, an outer diameter of 6 mm, an inner diameter of 3 mm and a height of 1.5 mm.

One typical temperature profile used in the above process is described below.
Temperature profile in Example
  Heating step
    Heating rate to 1200° C.: 300° C./hr
    Heating rate from 1200° C. to 1420° C.: 100° C./hr
  Holding step
    Holding at 1420° C. for 3.0 hours
  Cooling step
    Cooling rate from 1420° C. to 1000° C.: 100° C./hr
    Cooling rate from 1000° C. to room temperature: 250° C./hr The final composition of the samples of Examples and Comparative Examples was measured by fluorescent x-ray spectroscopy, finding that the main components, CaO, $SiO_2$, $Nb_2O_5$, $ZrO_2$ and $Ta_2O_5$ substantially corresponded to the raw material composition, while $Bi_2O_3$ and $MoO_3$ corresponded to 10 to 80 wt % of the addition amounts.

The toroidal cores thus obtained were measured for permeability at 10 kHz and 100 kHz and 25° C. and mean grain size. For the permeability measurement, an impedance analyzer was used. The results are shown in Table 1.

TABLE 1

| Sample No. | Mean grain size (µm) | Permeability 10 kHz | Permeability 100 kHz |
|---|---|---|---|
| 1 | 64 | 22800 | 16200 |
| 2 | 75 | 26100 | 15200 |
| 3 | 81 | 29700 | 13800 |
| 4 | 107 | 36300 | 15000 |
| 5 | 131 | 33600 | 14600 |
| 6 | 154 | 30200 | 13200 |
| 7 | 189 | 24800 | 11800 |
| 8* | 14 | 10300 | 10300 |
| 9* | 27 | 12100 | 12000 |
| 10* | 47 | 18200 | 13900 |

*outside the inventive range

The effectiveness of the invention is evident from the results shown in Table 1. Specifically, those samples in which the mean grain size is adjusted to 64 to 189 µm according to the invention (Sample Nos. 1 to 7 in Table 1) have a very high permeability at 10 kHz as compared with prior art samples (Sample Nos. 8 to 10 in Table 1), and a permeability at 100 kHz at least comparable to the prior art samples. In the samples of Examples, those crystal grains having a size from more than 50 µm to 140 µm accounted for more than 80% by volume.

Figure 2:
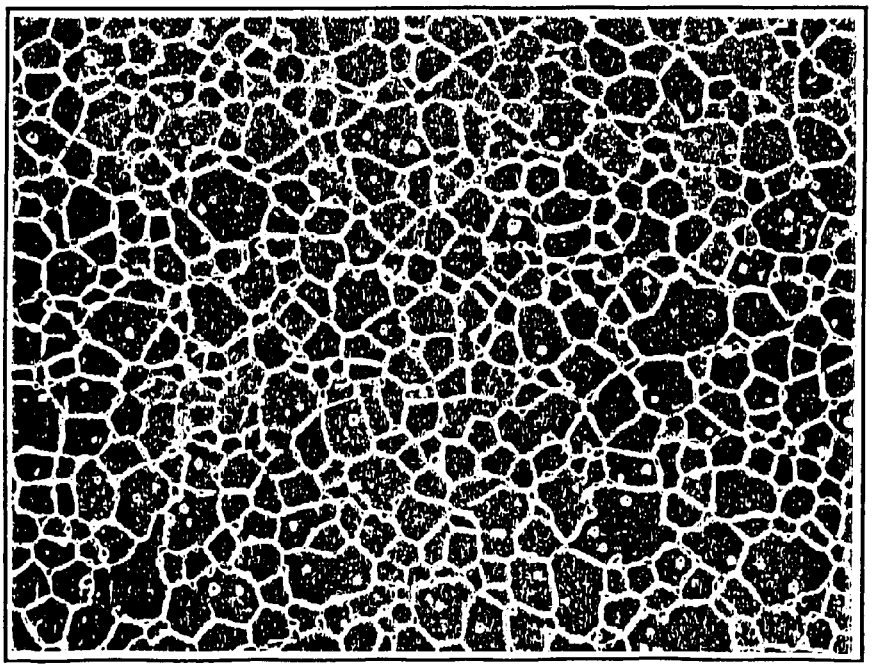
FIG. 2 is a drawing-substituting photograph showing a cross section of a comparative sample.

FIGS. 1 and 2 are photographs on polished cross-sectional surfaces of inventive and comparative samples taken through an optical microscope.

Example 2

While changing the composition of manganese-zinc base ferrite from Example 1, there were obtained Sample Nos. 11 to 16 containing $Bi_2O_3$, $MoO_3$ and P, Sample Nos. 17 and 18 containing $Bi_2O_3$ and P, and Sample No. 19 containing only P, all in addition to $CaCO_3$ and $SiO_2$ as auxiliary components. Also prepared were Comparative Sample Nos. 20 to 22 in which the amounts of $Bi_2O_3$, $MoO_3$ and P added were outside the above-described ranges.

The samples were examined as in Example 1. The results are shown in Table 2.

TABLE 2

| Sample No. | Auxiliary component content (wt %) | | | Permeability | |
|---|---|---|---|---|---|
| | $Bi_2O_3$ | $MoO_3$ | P | 10 kHz | 100 kHz |
| 11 | 0.01 | 0.01 | 0.0008 | 31000 | 13900 |
| 12 | 0.02 | 0.02 | 0.0008 | 36300 | 15000 |
| 13 | 0.02 | 0.02 | 0.0020 | 33100 | 14800 |
| 14 | 0.04 | 0.02 | 0.0008 | 35800 | 16200 |
| 15 | 0.02 | 0.04 | 0.0008 | 34900 | 16800 |
| 16 | 0.05 | 0.05 | 0.0008 | 28600 | 14700 |
| 17 | 0.02 | 0 | 0.0008 | 32100 | 13200 |
| 18 | 0.04 | 0 | 0.0008 | 30100 | 12100 |
| 19 | 0 | 0 | 0.0008 | 24300 | 12500 |
| 20* | 0 | 0 | 0.0050 | 18900 | 12300 |
| 21* | 0.02 | 0.02 | 0.0050 | 26200 | 15400 |
| 22* | 0.10 | 0.10 | 0.0008 | 16200 | 11400 |

*outside the inventive range or the preferred range

Example 3

While changing the composition of manganese-zinc base ferrite from Example 1, there were obtained Sample Nos. 31 to 34 containing $ZrO_2$, Sample Nos. 35 to 37 containing $Ta_2O_5$, and Sample Nos. 38 to 39 containing $Nb_2O_5$, all in addition to $CaCO_3$, $SiO_2$, $Bi_2O_3$, $MoO_3$ and P, as auxiliary components. Also prepared was Comparative Sample No. 40 to which none of the above additives were added.

The samples were examined as in Example 1. The results are shown in Table 3.

TABLE 3

| Sample No. | Auxiliary component content (wt %) | | | Permeability | |
|---|---|---|---|---|---|
| | $ZrO_2$ | $Ta_2O_5$ | $Nb_2O_5$ | 10 kHz | 100 kHz |
| 31 | 0.01 | 0 | 0 | 33900 | 16600 |
| 32 | 0.02 | 0 | 0 | 32800 | 18500 |
| 33 | 0.03 | 0 | 0 | 33500 | 19300 |
| 34 | 0.04 | 0 | 0 | 28800 | 20100 |
| 35 | 0 | 0.01 | 0 | 31900 | 17800 |
| 36 | 0 | 0.02 | 0 | 29800 | 19400 |
| 37 | 0 | 0.03 | 0 | 27900 | 21800 |
| 38 | 0 | 0 | 0.005 | 32500 | 18300 |
| 39 | 0 | 0 | 0.01 | 29900 | 19200 |
| 40* | 0 | 0 | 0 | 36300 | 15000 |

*outside the preferred range

BENEFITS

The manganese-zinc base ferrite of the invention exhibits a very high permeability in a band near the frequency of 10 kHz, and yet in a high frequency region at or beyond the frequency 100 kHz, a permeability at least comparable to the prior art.

What is claimed is:

1. A manganese-zinc base ferrite comprising iron oxide, manganese oxide and zinc oxide as main components in amounts calculated as $Fe_2O_3$, MnO and ZnO, respectively,

| | |
|---|---|
| $Fe_2O_3$ | 50 to 56 mol %, |
| MnO | 21 to 27 mol %, and |
| ZnO | 20 to 26 mol %, | and 0.0003 to 0.003% by weight calculated as P of phosphorus as an auxiliary component, and having a mean grain size from more than 50 μm to 200 μm.

2. The manganese-zinc base ferrite of claim 1 further comprising more than 0% to 0.08% by weight of bismuth oxide as an auxiliary component, based on the main components and calculated as $Bi_2O_3$.

3. The manganese-zinc base ferrite of claim 1 further comprising more than 0% to 0.12% by weight of molybdenum oxide as an auxiliary component, based on the main components and calculated as $MoO_3$.

4. The manganese-zinc base ferrite of claim 1 further comprising at least one oxide of niobium oxide, tantalum oxide and zirconium oxide as an auxiliary component in amounts calculated as $Nb_2O_5$, $Ta_2O_5$ and $ZrO_2$, respectively,

| | |
|---|---|
| $Nb_2O_5$ | more than 0 to 0.03 wt %, |
| $Ta_2O_5$ | more than 0 to 0.06 wt %, and |
| $ZrO_2$ | more than 0 to 0.06 wt %. |

5. The manganese-zinc base ferrite of claim 1 further comprising 0.005 to 0.05% by weight, calculated as CaO, of calcium oxide.

6. The manganese-zinc base ferrite of claim 1, having a permeability of at least 15,000 at 10 kHz.

7. The manganese-zinc base ferrite of claim 1, having a permeability of at least 15,000 at 100 kHz.

8. The manganese-zinc ferrite of claim 1, comprising in amounts calculated as $Fe_2O_3$, MnO and ZnO, respectively,

| | |
|---|---|
| $Fe_2O_3$ | 52 to 54 mol %, |
| MnO | 23 to 25 mol %, and |
| ZnO | 22 to 24 mol %. |

9. The manganese-zinc ferrite of claim 1, further comprising 0.005 to 0.015% by weight, calculated as $SiO_2$, of silicon oxide.

10. The manganese-zinc ferrite of claim 5, which comprises 0.01 to 0.03% by weight, calculated as CaO, of calcium oxide.

11. The manganese-zinc ferrite of claim 1, which comprises from 0.0005 to 0.002% by weight, calculated as P, of phosphorus.

12. The manganese-zinc ferrite of claim 4, comprising in amounts calculated as $Nb_2O_5$, $Ta_2O_5$ and $ZrO_2$, respectively,

| | |
|---|---|
| $Nb_2O_5$ | 0.003 to 0.02% by weight, |
| $Ta_2O_5$ | 0.01 to 0.04% by weight, and |
| $ZrO_2$ | 0.01 to 0.04% by weight. |

13. The manganese-zinc ferrite of claim 1, having a mean grain size of from more than 50 μm to 180 μm.

14. The manganese-zinc ferrite of claim 13, having a mean grain size of from 60 μm to 150 μm.

15. The manganese-zinc ferrite of claim 14, having a mean grain size of from 70 μm to 130 μm.

16. The manganese-zinc ferrite of claim 1, wherein grains having a grain size of from more than 50 μm to 140 μm account for at least 50% by volume.

17. The manganese-zinc ferrite of claim 6, having a permeability of at least 20,000 at 10 kHz.

18. The manganese-zinc ferrite of claim 17, having a permeability of at least 25,000 at 10 kHz.

19. The manganese-zinc ferrite of claim 6, having a permeability of from 15,000 to 35,000 at 10 kHz.

20. The manganese-zinc ferrite of claim 1, having a permeability of at least 2,000 at 500 kHz.

21. The manganese-zinc ferrite of claim 20, having a permeability of at least 3,500 at 500 kHz.

22. The manganese-zinc ferrite of claim 1, further comprising zirconium oxide as an auxiliary component in an amount calculated as $ZrO_2$ of from more than 0 to up to 0.06% by weight.

23. The manganese-zinc ferrite of claim 22, further comprising tantalum oxide as an auxiliary component in an amount calculated as $TaO_2O_5$ of from more than 0 to up to 0.06% by weight.

* * * * *